United States Patent
Muthusrinivasan et al.

(10) Patent No.: US 9,015,802 B1
(45) Date of Patent: *Apr. 21, 2015

(54) PERSONALLY IDENTIFIABLE INFORMATION DETECTION

(71) Applicant: Google Inc., Mountain View, CA (US)

(72) Inventors: Muthuprasanna Muthusrinivasan, Mountain View, CA (US); Paul Haahr, San Francisco, CA (US); Matthew D. Cutts, Los Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/024,943

(22) Filed: Sep. 12, 2013

Related U.S. Application Data

(63) Continuation of application No. 13/109,646, filed on May 17, 2011, now Pat. No. 8,561,185.

(51) Int. Cl.
  *G06F 21/00* (2013.01)
  *G06F 21/62* (2013.01)
  *H04L 29/06* (2006.01)

(52) U.S. Cl.
  CPC ........ *G06F 21/6245* (2013.01); *H04L 63/0823* (2013.01)

(58) Field of Classification Search
  CPC .................................................. H04L 63/0823
  USPC ........................................................... 726/22
  See application file for complete search history.

(56) References Cited

U.S. PATENT DOCUMENTS

| | | | | |
|---|---|---|---|---|
| 7,131,065 | B1* | 10/2006 | Kane | 715/208 |
| 7,558,777 | B1 | 7/2009 | Santos | |
| 7,693,827 | B2* | 4/2010 | Zamir et al. | 707/999.003 |
| 8,578,166 | B2* | 11/2013 | De Monseignat et al. | 713/175 |
| 2002/0198750 | A1 | 12/2002 | Innes et al. | |
| 2003/0061567 | A1 | 3/2003 | Brown et al. | |
| 2004/0050929 | A1 | 3/2004 | Fayfield | |
| 2005/0257261 | A1 | 11/2005 | Shraim et al. | |
| 2006/0047724 | A1* | 3/2006 | Messing et al. | 707/204 |
| 2006/0206724 | A1* | 9/2006 | Schaufele et al. | 713/186 |
| 2008/0162449 | A1* | 7/2008 | Chao-Yu et al. | 707/5 |
| 2009/0064330 | A1* | 3/2009 | Shraim et al. | 726/22 |
| 2009/0077383 | A1* | 3/2009 | de Monseignat et al. | 713/175 |

(Continued)

OTHER PUBLICATIONS

Wikipedia.com 'Regular expression' http://en.wikipedia.org/wiki/Regular_expression [online] [retrieved Aug. 24, 2011], 16 pages.

*Primary Examiner* — Morshed Mehedi
(74) *Attorney, Agent, or Firm* — Fish & Richardson P.C.

(57) ABSTRACT

Methods, systems, and apparatus, including computer programs encoded on a computer storage medium, for privacy protection. In one aspect, a method includes accessing personally identifiable information (PII) type definitions that characterize PII types; identifying PII type information included in content of a web page, the PII type information being information matching at least one PII type definition; identifying secondary information included in the content of the web page, the secondary information being information that is predefined as being associated with PII type information; determining a risk score from the PII type information and the secondary information; and classifying the web page as a personal information exposure risk if the risk score meets a confidentiality threshold, wherein the personal information exposure risk is indicative of the web page including personally identifiable information.

19 Claims, 7 Drawing Sheets

(56) References Cited

U.S. PATENT DOCUMENTS

| | | |
|---|---|---|
| 2010/0180213 A1 | 7/2010 | Karageorgos et al. |
| 2010/0263020 A1* | 10/2010 | Harrison et al. ................ 726/1 |
| 2011/0087842 A1* | 4/2011 | Lu et al. ...................... 711/126 |
| 2011/0137762 A1* | 6/2011 | Pepe et al. ...................... 705/30 |
| 2011/0219291 A1 | 9/2011 | Lisa |
| 2012/0210203 A1* | 8/2012 | Kandekar et al. ............. 715/230 |
| 2013/0088520 A1* | 4/2013 | Mak .............................. 345/684 |

\* cited by examiner

PERSONALLY IDENTIFIABLE INFORMATION DETECTION

CROSS-REFERENCE TO RELATED APPLICATION

This Application is a continuation of U.S. application Ser. No. 13/109,646, titled "Personally Identifiable Information Detection" filed May 17, 2011, which is incorporated herein by reference.

BACKGROUND

This specification relates to privacy protection.

The Internet provides access to a wide variety of resources, for example, webpages, image files, audio files, and videos. A search system can select one or more resources in response to receiving a search query. A search query is data that a user submits to a search engine to satisfy the user's informational needs. The search queries are usually in the form of text, e.g., one or more query terms. The search system selects and scores resources based on their relevance to the search query and on their importance relative to other resources, and provides search results that link to the selected resources. The search results are typically ordered according to the scores and presented according to this order.

Each underlying resource that a search result references includes content, such as text, images, audio and/or video content. The content may be controlled by a publisher (e.g., an owner or manager of a particular web site) or may be user contributed (e.g., blog posts, discussion threads, etc.). Some of the content that is made available in a resource may be personally identifiable information (PII). Personally identifiable information is information that can be used to distinguish or trace an individual's identity, such as their name, social security number, biometric records, etc., alone, or when combined with secondary personal or secondary identifying information that is linked or linkable to a specific individual, such as date and place of birth, mother's maiden name, etc.

The publication of certain types of personally identifying information can be innocuous. For example, a person may voluntarily publish personally identifying information in a social network page. Examples of this include a person's full name, age, gender, city and state of residence, etc. However, the publication of other types of personally identifying information may be harmful. For example, the publication of a person's name, Social Security number, bank account number and a password to electronically access the bank account exposes the person to the risk of identity theft and monetary theft. Typically, people do not voluntarily publish this latter type of personally identifying information.

Unfortunately, malefactors may gain access to such information and offer this information for sale over the Internet. When offering and publishing such information, malefactors sometimes use publicly available websites at which users may freely publish information. Examples of such websites include social network websites, community bulletin boards, newsgroups, and the like. The malefactor may register as a user and post contact information at which the malefactor can be reached and through which the personally identifiable information of individuals can be provided.

The resources that are available through these websites, and most other websites, are often processed by search systems (e.g., indexed for search processing and optionally cached by the search system) so that the resources can be identified in response to search queries. Thus, it is possible that users will be provided with search results that link to underlying webpages that include personally identifiable information.

SUMMARY

This specification describes systems and methods for detecting certain types of personally identifiable information included in resource content.

In general, one innovative aspect of the subject matter described in this specification can be embodied in methods that include the actions of accessing, by a data processing apparatus, personally identifiable information (PII) type definitions that characterize PII types; identifying, by the data processing apparatus, PII type information included in content of a web page, the PII type information being information matching at least one PII type definition; identifying, by the data processing apparatus, secondary information included in the content of the web page, the secondary information being information that is predefined as being associated with PII type information; determining a risk score from the PII type information and the secondary information; and classifying the web page as a personal information exposure risk if the risk score meets a confidentiality threshold, wherein the personal information exposure risk is indicative of the web page including personally identifiable information. Other embodiments of this aspect include corresponding systems, apparatus, and computer programs, configured to perform the actions of the methods, encoded on computer storage devices.

Particular embodiments of the subject matter described in this specification can be implemented to realize one or more of the following advantages. The personally identifying information detection system detects certain types of personally identifiable information in the content of resources and classifies those resources as personal identifiable information exposure risks. A search system does not provide search results that reference resources that are so classified. Accordingly, the search system does not aid in further distribution of certain types of personally identifiable information.

Furthermore, additional steps can be taken in response to the identification and classifications. The resource can be flagged for review. Additionally, a publisher of the website that hosts the resource can be contacted, and the publisher can take necessary steps to delete the information from the resource.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

This specification describes technologies for detecting certain types of personally identifiable information included in resource content. In some implementations, a system accesses personally identifiable information (PII) type definitions that characterize PII types. Example PII type definitions include data characterizing PII for credit cards, PII for Social Security numbers, PII for passport numbers, PII for government records, PII for bank records and the like. Example PII type definitions may include templates that are used to identify PII type information, such a regular expressions. Also associated with the PII type definitions are secondary information types, such as keywords "billing address," "phone number," "credit card expiration date," "CVV", etc.

The system processes resources and compares the content of the resources to the PII type definitions and the secondary information types. When information is found that matches a PII type definition, content surrounding the information is compared to the secondary information types. If there is content that matches the secondary information types, then the information that is found to match the PII type definition may be determined to be actual personally identifying information.

For example, a resource may be a mathematical thesis that is publicly available over the Internet. Included in the thesis is a data table of various numbers generated by a novel pseudo-random number generator. By chance, one of the numbers may match credit card format and may actually be a valid credit card number. However, because many of the terms surrounding the data table do not include terms that are defined as secondary information types (e.g., terms such as "expiration date", "maiden name," etc.), the PII type information is determined not to be personally identifying information.

By way of another example, the resource may be a discussion thread in which malefactor has posted personal identifiable information that includes a person's name, the person's credit card number, the CVV code for the credit card number and the expiration date of the credit card. Accordingly, there will be a least several terms surrounding the credit card number that also match the secondary information types (e.g., keywords such as "expiration date", "CVV", etc.). Thus, the content of the discussion thread will be identified as actual personally identifying information.

These features and other features are described in more detail below.

Example Search System Environment

Figure 1:
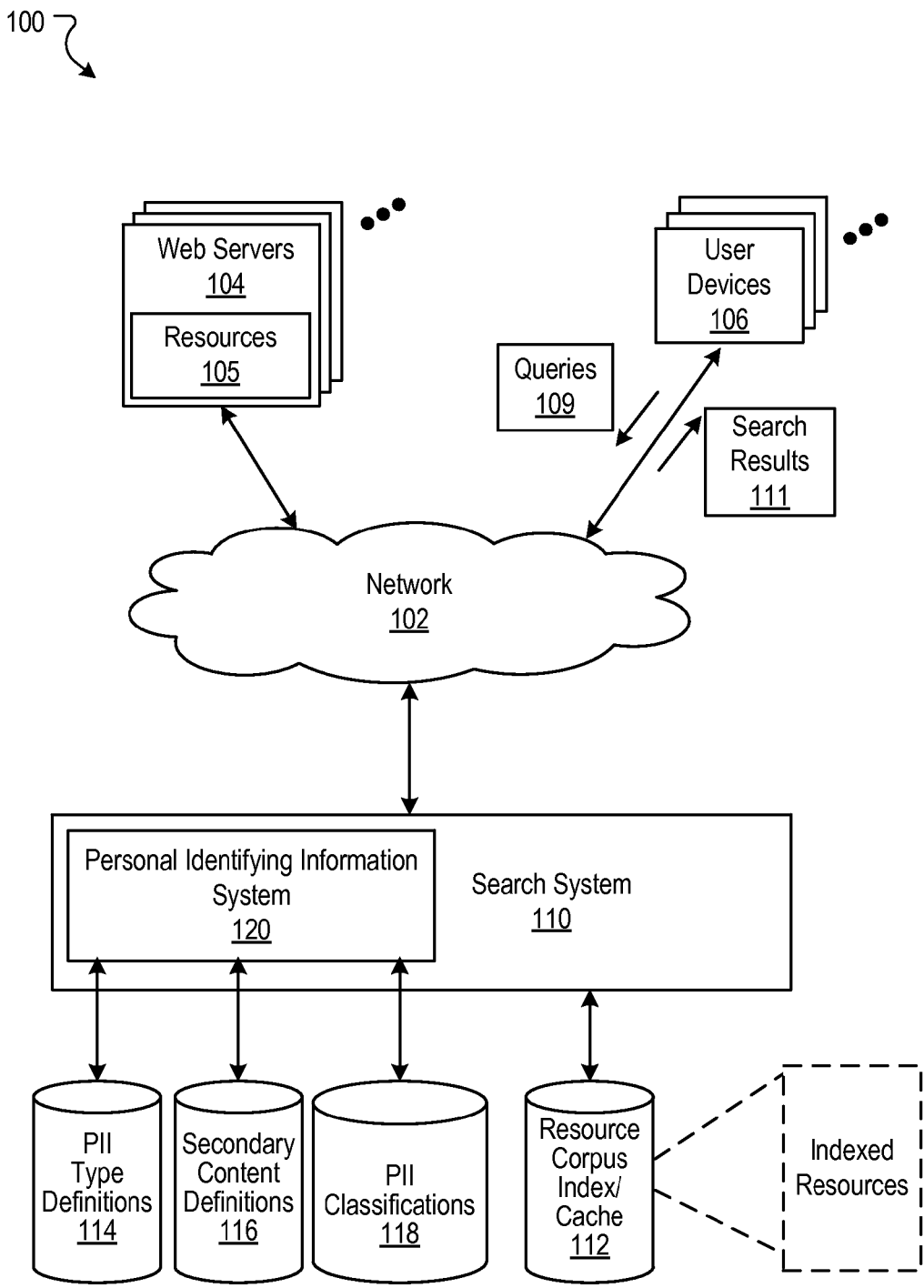
FIG. 1 is block diagram of an environment in which a personally identifiable information system is used.

FIG. 1 is block diagram of an environment in which a personally identifiable information system is used. The example environment 100 includes a network 102, e.g., a local area network (LAN), wide area network (WAN), the Internet, or a combination of them, that connects web servers 104, user devices 106, and the search system 110. The environment 100 may include many thousands of web servers 104 and user devices 106.

The web servers 104 are used to host web sites. A web site is a one or more resources 105 associated with a domain name. An example web site is a collection of webpages formatted in hypertext markup language (HTML) that can contain text, graphic images, multimedia content, and programming elements, such as scripts. Each web site is maintained by a publisher, e.g., an entity that manages and/or owns the web site.

Each resource 105 is associated with a resource address, such as a URL. A common resource is a webpage resource that includes text and may include links to other types of resources that are rendered and displayed with the text of the webpage resource. In particular, image resources are often rendered with webpage resources.

To facilitate searching of these resources 105, the search system 110 identifies the resources by crawling the publisher web sites 104 and indexing the resources provided by the publisher web sites 104. In some implementations, the indexes are stored in a resource corpus index 112. The resource corpus index 112 may also include, or be associated with, a cache that is used to store copies of the resources 105.

In response to receiving a search query 109, the search system 110 searches the resource corpus index 112, and resources are ranked based on relevance scores that measure the relevance of the resource to the query. Relevance scores can be determined from information retrieval ("IR") scores that measure the relevance of the resources to the query, and optionally an authority score of each resource relative to other resources.

The search system 110 then generates search results 111. Each search result identifies a resource that is responsive to a particular search query, and includes a link to a corresponding resource, e.g., a link to a webpage. An example search result 111 includes a webpage title, a snippet of text, and a URL of the webpage. The search results 111 are ordered according to the relevance scores and provided to the user device according to the order.

The user devices 106 receive the search results, e.g., in the form of one or more webpages, and render the pages for presentation to users. In response to the user selecting a link in a search result at a user device 106, the user device 106 requests the resource identified by the link. The web site 104 hosting the resource receives the request for the resource from the user device 106 and provides the resource to the requesting user device 106.

As previously described, resources may include personally identifying information. If the resources are identified in response to a search query, then the personally identifying information may be exposed to many users. To guard against this, the search system 110 includes a personally identifying information system 120. The PII system 120 accesses PII type definitions 114 and secondary content definitions 116 and processes resources to determine whether the resources include PII type information and, if so, whether the resource presents a personal identifiable information exposure risk. A resource presents a personal identifiable information exposure risk if the resource is determined to likely include personal identifiable information of a particular person that matches at least one of the PII type definitions 114.

In operation, the PII system 120 accesses the PII type definitions 114 that define PII types, and accesses the secondary content definitions that define secondary information that is specified as being associated with PII type definitions. The PII type definitions and the secondary content definitions are described in more detail below.

For each resource that is processed, the PII system 120 determines whether the resource includes PII type information. PII type information is information in the content of the resource that matches at least one PII type definition. For example, a Social Security number has particular numerical format, and any sequence of numbers that matches that particular numerical format may be identified as PII type information. Whether the sequence of numbers that is identified as PII type information is determined to be actual personally identifiable information depends on whether secondary information is included in the content of the resource.

Each instance of secondary information that is identified contributes to a risk score that the PII system 120 calculates. If the risk score meets a confidentiality threshold, the PII system classifies the webpage as a personal information exposure risk. The personal information exposure risk is indicative of the webpage including personally identifiable information.

Figure 2A:
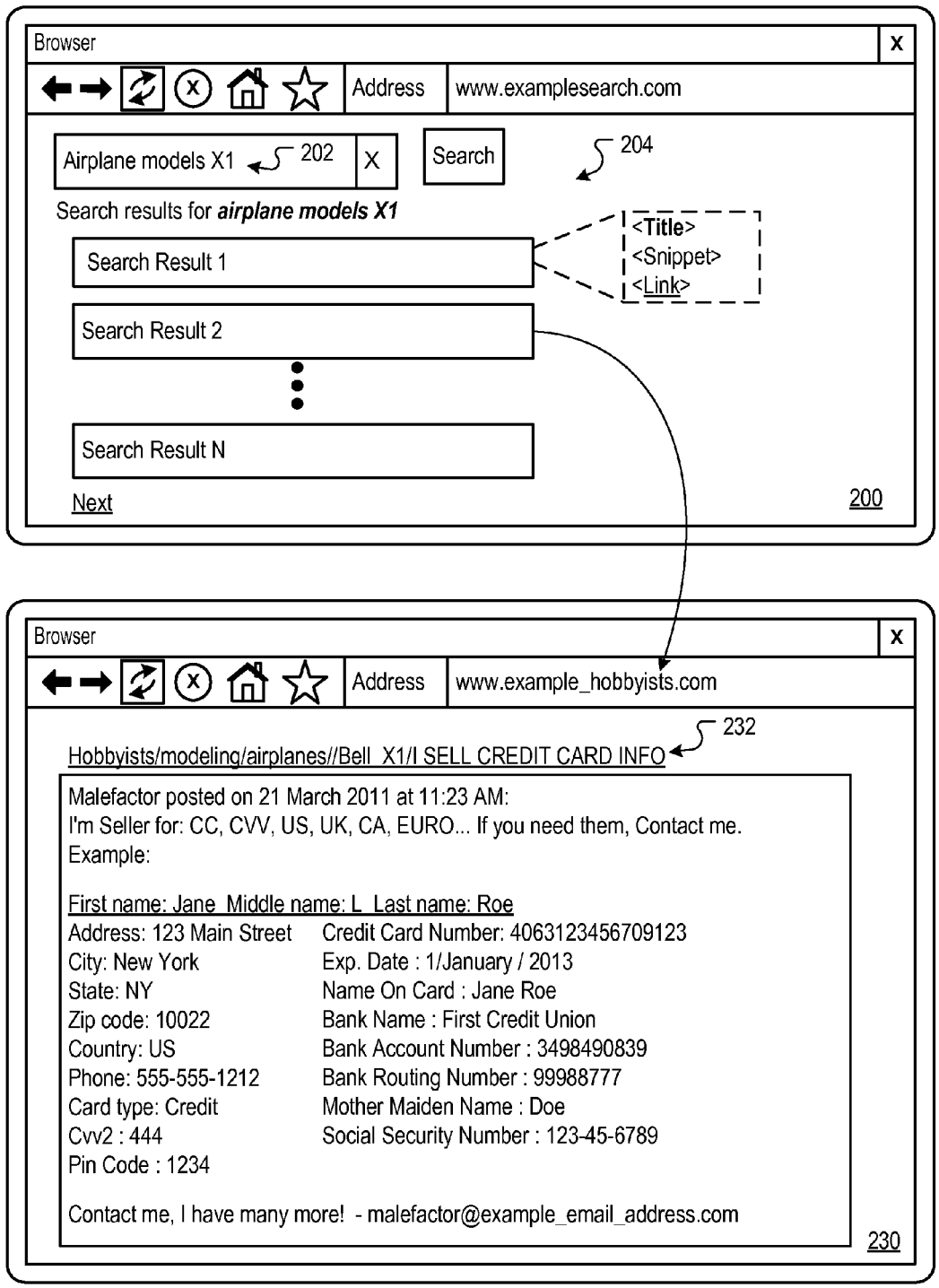
FIGS. 2A and 2B each illustrate a series of screens shots displaying search results and an underlying resource referenced by one of the search results.

Accordingly, the mere presence of information that satisfies the PII type definition does not necessarily mean that the underlying resource includes personally identifying information. This concept is illustrated with reference to FIGS. 2A and 2B, which each illustrate a series of screens shots displaying search results and an underlying resource referenced by one of the search results. In particular, FIG. 2A is a series of screens shots illustrating the display of search results 204 and an underlying resource 230 referenced by one of the search results 204. A search results page 200 is returned in response to the query 202 ("airplane models X1"). For this query, the search results include a search result that links to a discussion thread on a hobbyist website. The discussion website includes a discussion area for model airplanes, and includes the particular discussion area directed to the modeling of the Bell X1 airplane.

However, a malefactor has posted a particular thread 232 in which the malefactor has published personal identifiable information of a credit card holder, Jane L. Roe. In particular, the personally identifying information includes her name, her credit card number, her bank account number, and her social security number. The credit card number, bank account number, and social security number each satisfy a corresponding PII type definition. Accordingly, the PII system 120 identifies each of these portions of content as PII type information.

Within a predefined textual distance of each identified occurrence of PII type information (e.g., 20 words before and after each number in this example), secondary information that is predefined as being associated with various PII types is also present. For example, the words "Exp. Date", "Credit Card", "Maiden Name" "Social Security Number", etc., may be keywords in the secondary content definitions 116, and all are present within a predefined textual distance of one or more these numbers in the resource. Accordingly, the webpage 230 presents a very high risk of exposure of personally identifying information.

Using a scoring algorithm described in more detail below, the PII system 120 calculates a risk score for the resource 230. The risk score exceeds a confidentiality threshold, and thus the resource 230 is classified as a personal information exposure risk.

Figure 2B:
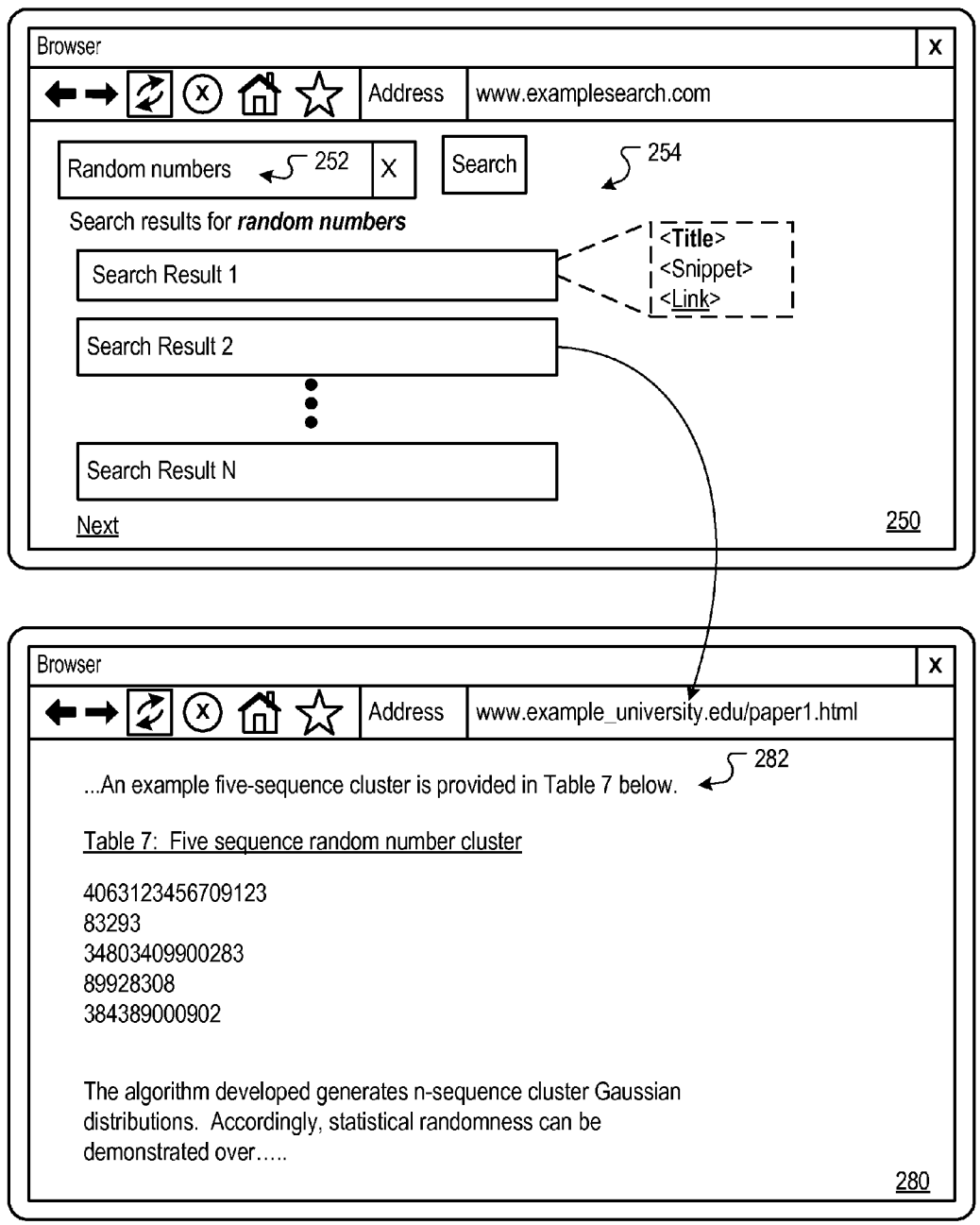

FIG. 2B is similar to FIG. 2A. A search results page 250 is returned in response to the query 252 ("random numbers"). For this query, the search results 254 include a search result that links to a student's paper published as a webpage 280 at a university website. The paper describes a random number generator algorithm, and includes a table of five numbers that are generated by use of the algorithm. One of the numbers, by chance, happens to be a valid credit card number. Accordingly, the paper includes information that satisfies a PII type definition (e.g., credit card numbers), and the PII system 120 calculates a risk score for the resource 280. However, none of the other content within the predefined textual distance of the number is secondary information that is associated with the corresponding PII type definition. Accordingly, the PII system 120 determines that the risk score for the resource 280 does not meet the confidentiality threshold, and does not classify the resource 280 is a personal information exposure risk. This reflects the fact that the webpage 280 presents no risk of exposure of personally identifying information, even though, by chance, the resource 280 includes an actual credit card number.

Example PII Detection System and Process

Figure 3:
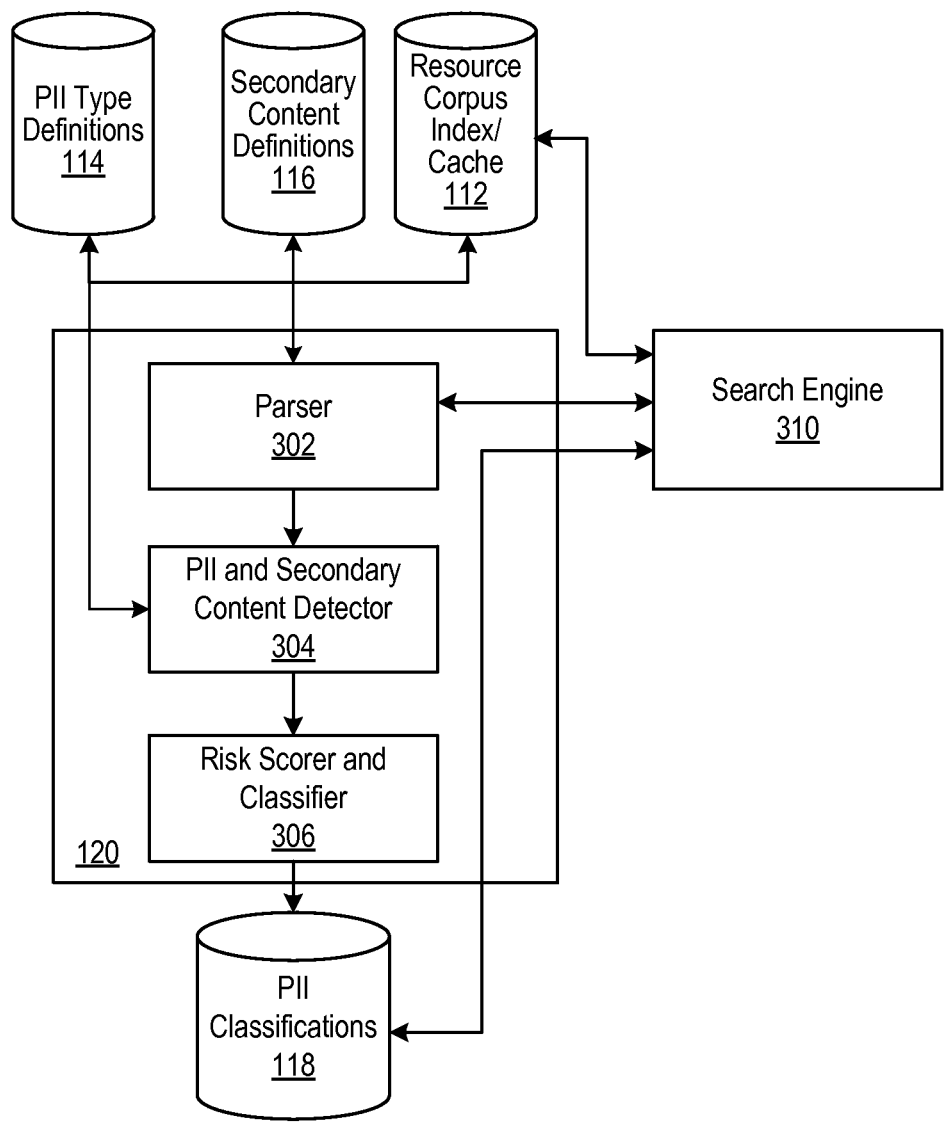
FIG. 3 is a block diagram of an example implementation of a personally identifiable information system.

FIG. 3 is a block diagram of an example implementation of the personally identifiable information system 120. The example architecture and functional distributions described with reference to FIG. 3 is just one way that the PII system 120 can be implemented. Other architectures and functional distributions can also be used.

The system 120 includes a parser 302, a PII and secondary content detector 304, and a risk scorer and classifier 306. Operation of the parser 302, the secondary content detector 304, and the risk scorer and classifier 306 is described with reference to FIG. 4, which is a flow diagram of an example process 400 for identifying and processing personally identifiable information in a resource.

The PII system 120 accesses personally identifiable information type definitions that characterize PII types and secondary content (402). For example, the PII and secondary content detector 304 accesses the PII type definitions 114 and secondary content definitions 116. The PII type definitions 114, in some implementations, include templates having data for determining a match of content to the PII type. For example, for a government identifier that conforms to a particular identifier format, such as Social Security numbers, the templates may include data defining a first three-digit field code, a second two-digit field code, and a third four-digit field code. For each respective field code, particular numbers or patterns that coincide with valid Social Security numbers may be specified. Accordingly, the template is used to identify valid security numbers included in resource content.

By way of another example, PII templates for payment cards (e.g., debit cards, credit cards) may specify particular payment card formats of payment card providers. For example a particular credit card provider, e.g., Brand X Card, may have either 15 or 16 digit credit card numbers, and either the 15 or 16 credit card numbers may begin with a prefix of 10, 12, or 13. Thus, an example credit card template is:

Brand X Card: {"10, 12, 13", "15, 16"}

The credit card template includes a first set of data specifying known prefixes of the card, and a second set of data specifying valid lengths of credit card numbers for the card. Although prefixes are used, other affixes can also be used, provided the affixes are known for a particular credit card. In general, any subset of data defining a sequence of numbers that is less than the length of the card number specified by the length data, and that is included in the credit card number, can be used.

Although templates are described for Social Security numbers and credit card numbers, other templates can also be used for other types of personally identifying information. Additionally, the templates need not be limited to numbers, and can include any alphanumeric data that can be used to identify information that satisfies a particular PII type definition. For example, templates can be used for passports, government records, bank accounts, and the like.

Additionally, the templates can be implemented in other ways than described above. For example, regular expression can be used to match strings of text, such as particular characters, words, or patterns of characters that corresponds to PII type information.

Each template is associated with corresponding secondary content definitions. Particular secondary content definitions depend on the template type. For example, associated content definitions for a credit card may include keywords such as "expiration date", "credit card", "CVV", CVV2", "PIN", and the like. Likewise, associated content definitions for Social Security number may include "DOB", "SSN", "Social Security number", and the like.

The PII system 120 identifies PII type information included in the content of the resource (404). For example, the parser 302 accesses a resource and parses the content of the resource for inspection by the PII and secondary content detector 304. In some implementations in which a cached copy of the resource is stored in the cache, the parser 302 can retrieve the resource from the cache.

In some implementations, the parser uses a sliding window to parse the content of the resource. In particular, the parser 302 can use a sliding window of up to n characters (e.g., 200 characters). Alternatively, the parser 302 can use a sliding window of up to m words (e.g., 40 words, where each word is a continuous sequence of alphanumeric characters that does not include a space or punctuation mark). The parser 302 can also be configured to ignore markup language tags, markup language formatting instructions, and the like.

The parser 302 uses the sliding window by initially selecting the first n characters (or m words), and then processing the data to detect PII type information. Each adjustment of the sliding window moves the sliding window by deleting one of the selected characters (or words) and adding a next character (or word) in the sequence of characters (or words) of the content.

The parser 302 outputs the parsed data to the PII and secondary content detector 304. The PII and secondary content detector 304, in turn, compares the data received from the parser 302 to the PII type definitions 114. For example, for credit card templates, the PII and secondary content detector 304 compares data output from the parser 302 to the credit card templates to determine whether any sub-portion of content of the webpage includes a sequence of numbers that match the subset data and length data of at least one of the credit card templates. With respect to the Brand X credit card template described above, 15- or 16-number sequences that begin with the numbers 10, 12, or 13 will be identified as a match.

The PII system 120 identifies secondary information included in the content of the resource (406). For example, in response to a match, the PII and secondary content detector 304 compares text within a predefined text distance of the matching content (e.g., a threshold number of characters before or after the matching content, or a threshold number of words before or after the matching content) to the secondary content definitions 116. In some implementations, the secondary content definitions are keywords, where each keyword is one or more words or numbers, the PII and secondary content detector 304 determines whether any text within the predefined text distance of the matching content matches one or more of the secondary content definitions 116. If a match is found, the PII and secondary content detector 304 identifies the matching content in the resource as secondary information.

The PII system 120 determines the risk score from the PII type information and secondary information identified in the resource (408). The PII and secondary content detector 304 outputs data describing the PII type information identified in the resource, and the identified secondary information, to the risk scorer and classifier 306. The risk scorer and classifier 306, in turn, determines a risk score from the PII type information and the secondary information. One example process by which a risk score is determined is described with reference to FIG. 6 below.

The PII system 120 determines if the risk score is greater than a confidentiality threshold (410). For example, the risk scorer and classifier 306 compares the risk score of the resource to a confidentiality threshold. If the risk score meets a confidentiality threshold, then the risk scorer and classifier 306 classifies the resource as a personal information exposure risk (412). Conversely, if the risk score does not meet the confidentiality threshold, then the risk scorer and classifier 306 does not classify the resource as a PII risk (414). The classifications are stored in the PII classifications 118.

The classification as a personal information exposure risk is indicative of the resource including personally identifiable information that meets at least one of the PII type definitions 114. While a resource may include personally identifiable information, if that personally identifiable information is not defined by one of the PII type definitions 114, the resource will not be classified as a personal information exposure risk. This is because not all resources should be classified as a personal information exposure risk. For example, a person's social network page may include a unique identifier for that person and that can be used to uniquely identify that person. However, the unique identifier may be of a type such that disclosure does not present a financial risk or some other risk of harm to the person. Accordingly, it is excluded from the PII type definitions 114. Conversely, the person's credit card number, social security number, bank account numbers, etc., are of the type of personal identifiable information for which disclosure does present a financial risk or some other risk of harm to the person. Accordingly, this type of personal identifiable information is described by the PII type definitions 114.

Additional PII Detection Processing

Figure 5:
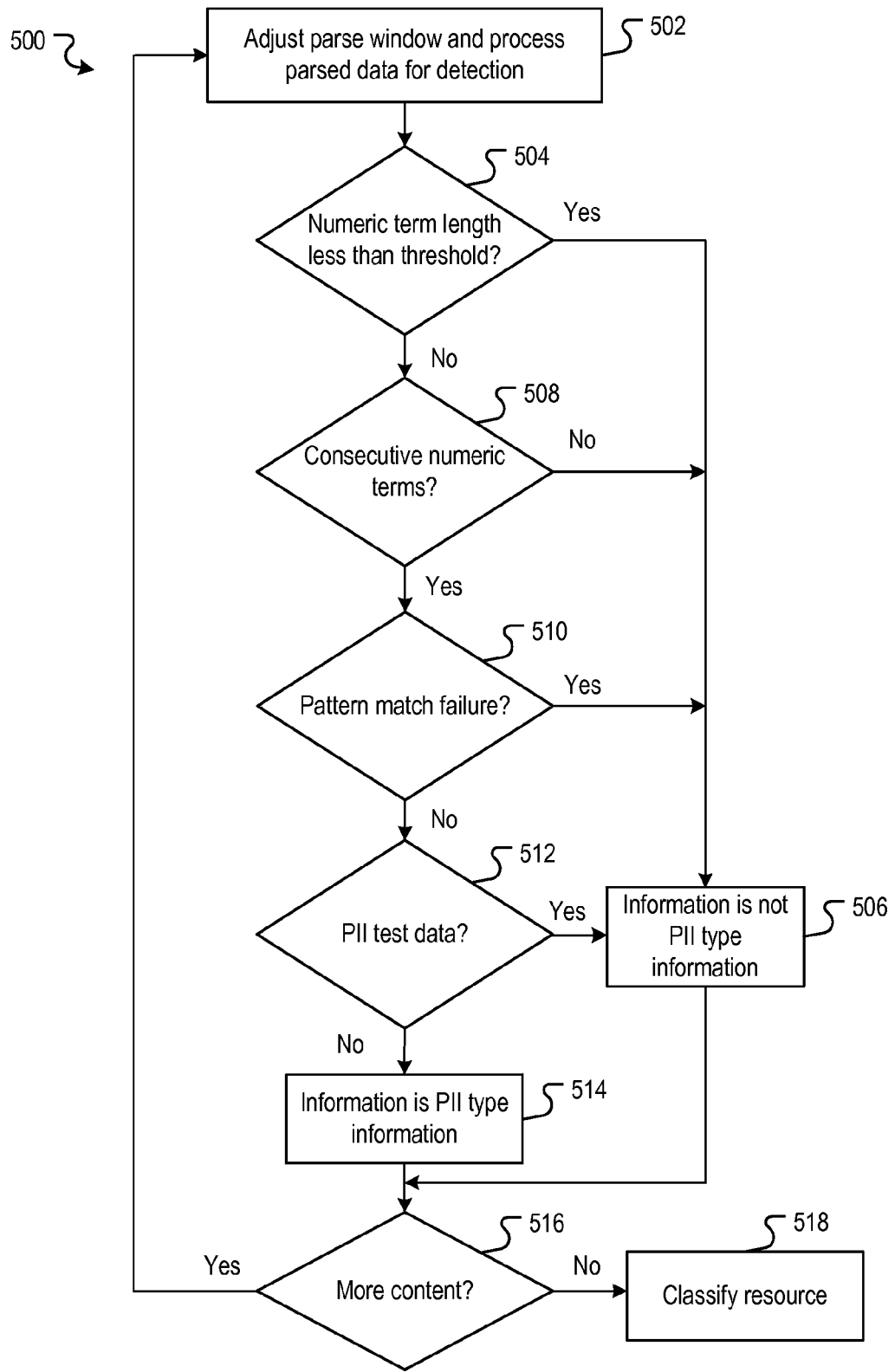
FIG. 5 is a flow diagram of an example process for identifying information that satisfies a personally identifiable information template.

In some implementations, there are additional conditions for determining whether portions of information in a resource constitute information that may be personally identifiable information. FIG. 5 is a flow diagram of an example process 500 for identifying information that satisfies a personally identifiable information template. The process 500 can be implemented in the PII system 120.

The PII system 120 adjusts the parsed window and processes the parsed data for detection (502). For example, the parser 302, parsing data of a resource, provides the parsed data to the PII and secondary content detector 304.

The PII system 120 determines if a numerical term length derived from the parsed data is less than a minimum threshold term length (504). The numerical term length is determined from the sub-portion of the content of the resource (i.e., the parsed data) and is a measure of consecutively occurring numbers in the sub-portion of the content. For example, if the numerical term length is less than three, then the parsed data is determined to not include PII type information. Other ways of determining the numerical term length can also be used.

If the numerical term length is less than the threshold, then the PII system determines that the information is not PII type information (506). Conversely, if the numerical term length meets the threshold, then the PII system 120 determines if there are consecutive numerical terms (508). In some implementations, consecutive numerical terms are determined to be consecutively occurring numbers or numbers that are only separated by a space or a dash; numbers separated by other alphanumeric characters are not considered consecutively occurring numbers.

If the numbers are not consecutive occurring numbers, then the PII system determines that the information is not PII type information (506). Conversely, if the numbers are consecutively occurring numbers, then the PII system 120 determines if there is a pattern match failure (510). For example, the PII and secondary content detector 304 compares the parsed data to the PII type definitions 114. Thus, for the Brand X payment card template described above, any 15 or 16 digit number that begins with a 10, 12, or 13 prefix constitutes a pattern match.

If the parsed information does not constitute a pattern match, the PII system determines that the information is not PII type information (506). Conversely, if the parsed data constitutes a pattern match, then the PII system 120 determines if the parsed data is PII test data (512). For example, in the case of credit card numbers, many credit card companies have issued test credit card numbers for the purposes of testing credit card clearance processes. Test credit card numbers may be a unique number, or may be defined by the corresponding template that can be used to detect valid test credit card numbers.

If the PII system 120 determines that the parsed data constitutes test information, then the information is determined not to be PII type information (506). Conversely, if the PII system determines that the parsed data does not constitute PII test data, then the PII system 120 determines that the information is PII type information (514).

The PII system 120 then determines if there is more content in the resource that needs to be parsed (516). If so, the PII system 120 adjusts the parse window and begins processing the newly parsed data. If not, then the PII system classifies the resource (518).

The process 500 describes several example conditions to reduce the likelihood of false positive identifications of PII type information in resource content. The example conditions described with reference to FIG. 5 are not exhaustive, and additional false positive checking conditions can be implemented. For example, checksums can be evaluated for credit card numbers according to the Luhn formula. Numbers that fail the checksum evaluation are determined to not constitute PII type information.

By way of another example, if the parsed data defines numbers or other information that is rendered within a rendering distance of an input data field or drop-down menu item, the PII system 120 determines that the parsed data is not PII type information. This is because often input data fields or drop-down menu items include instructional content that may show PII type information, such as a credit card number, CVV code, and other data that, if processed through the scoring algorithm, may result in a false positive determination of PII information being present in resource.

The rendering distance, in some implementations, is a predefined display distance from a data input field, and can, for example, be measured in pixels. In some implementations, the rendering distance can be measured by rendering the resource in a virtual machine environment.

In some implementations, the document object model of the resource can also be examined to determine whether the information is otherwise associated with a particular data input field. For example, information that is embedded within a particular frame that includes instructions for the data input field and that is separated from the data input field instructions by less than a predefined number of instructions may be considered to not be PII type information.

In some implementations, multiple documents for a particular domain can be checked to determine whether data patterns of displayed data are repeated across multiple documents. Such data patterns are indicative of information that is not actual PII information. For example, many documents may include instructions for ordering goods in an upper left hand corner of a web page. Often such instructions are rendered by the same or very similar markup language code. Accordingly, their repetition is a signal that the data are not actual PII information.

Example PII Scoring Process

Figure 6:
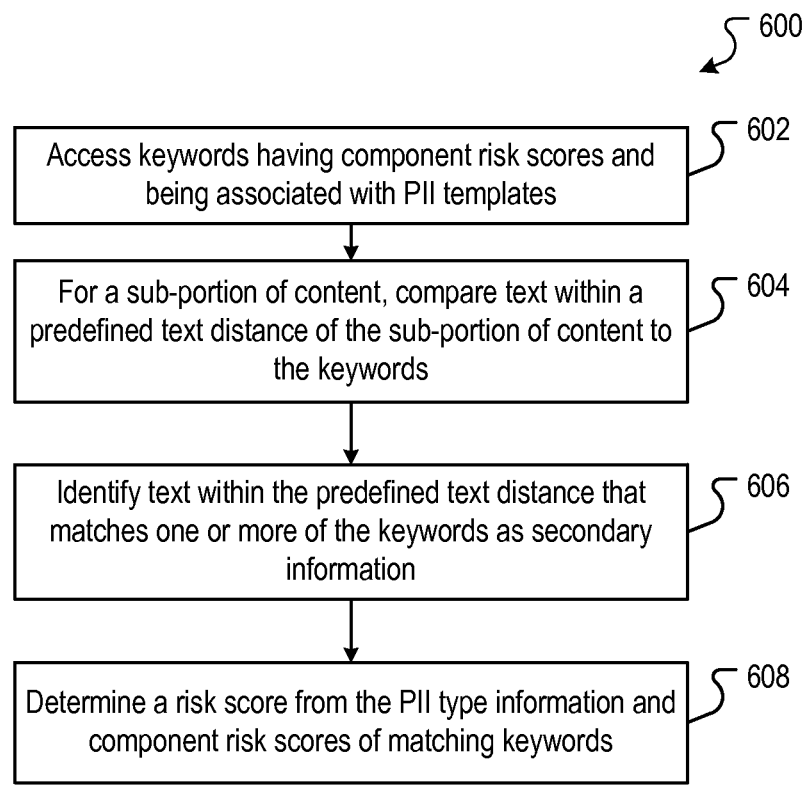
FIG. 6 is a flow diagram of an example process for determining a risk score for a resource.

To classify the resource, the PII system 120 detects secondary content occurring within a predefined distance of the PII type information detected in the resource. FIG. 6 is a flow diagram of an example process 600 for determining a risk score for a resource.

The PII and secondary content detector 304 accesses keywords having component scores and that are associated with the PII templates (602). For example, in some implementations the secondary content definitions 116 are keywords, and each keyword has a corresponding component risk score. The magnitude of the component risk score is indicative of the confidence that the identified PII type information is actually personally identifiable information. In some implementations, the higher the positive value of the component risk score, the higher the confidence that the identified PII type information is actually personally identifiable information. For example, the keywords CVV, CVV2, and SSN may have respective component risk scores of 0.8, 1.0, and 0.8; the keywords "expiration" and "credit card" may have component risk scores of 0.6; and the provider name of each credit card may have a component risk score of 0.5. Some component risk scores may be zero or even negative values. For example, keywords such as "dummy", "test number", and "sample" may have respective component risk scores of −2.0, −3.0, and −1.0.

The PII and secondary content detector 304, for a sub-portion of the content relative to the location of the PII type information, compares text within a predefined text distance of the sub portion of the content to the keywords (604). Based on the comparison, the PII and secondary content detector 304 identifies text within the predefined text distance that matches one or more keywords as secondary information (606).

The risk scorer and classifier 306 determines other risk score from the PII type information and from the component risk scores of matching keywords (608). In some implementations, the risk scorer and classifier 306 determines a risk score according to equation (1) below:

$$RS = f(PII[1,0], [CR1, D1; CR2, D2; \ldots CRn, Dn]) \quad (1)$$

Where:
  RS is the risk score;
  PII[1,0] is a Boolean value that is true when PII type information for the particular PII type definition is detected in the resource; and
  [CR1, D1; CR2, D2; ... CRn, Dn] is a vector of component risk scores of corresponding keywords that are identified as being present in the secondary content, and the respective text distances each corresponding keyword from the identified PII type information.

The text distances may be measured in terms of characters and or words. In some implementations, equation (1) adjusts the component risk score in inverse proportion to the text distance. The adjusted component risk scores are then used to generate the risk score RS for the resource. For example, component risk scores can be adjusted linearly based upon the distance D; e.g., a distance of 1 (e.g., one word) results in no adjustment of the component risk score, while the maximum distance of 40 results in only 2.5% of the component risk score CR being attributed to the final risk score RS. Many other adjustment algorithms can also be used.

In some implementations, the risk score RS is an aggregate value of all adjusted component risk scores CR. In other implementations, the risk score RS is based on a central tendency of the adjusted component risk scores CR. Other functions can also be used.

Figure 4:
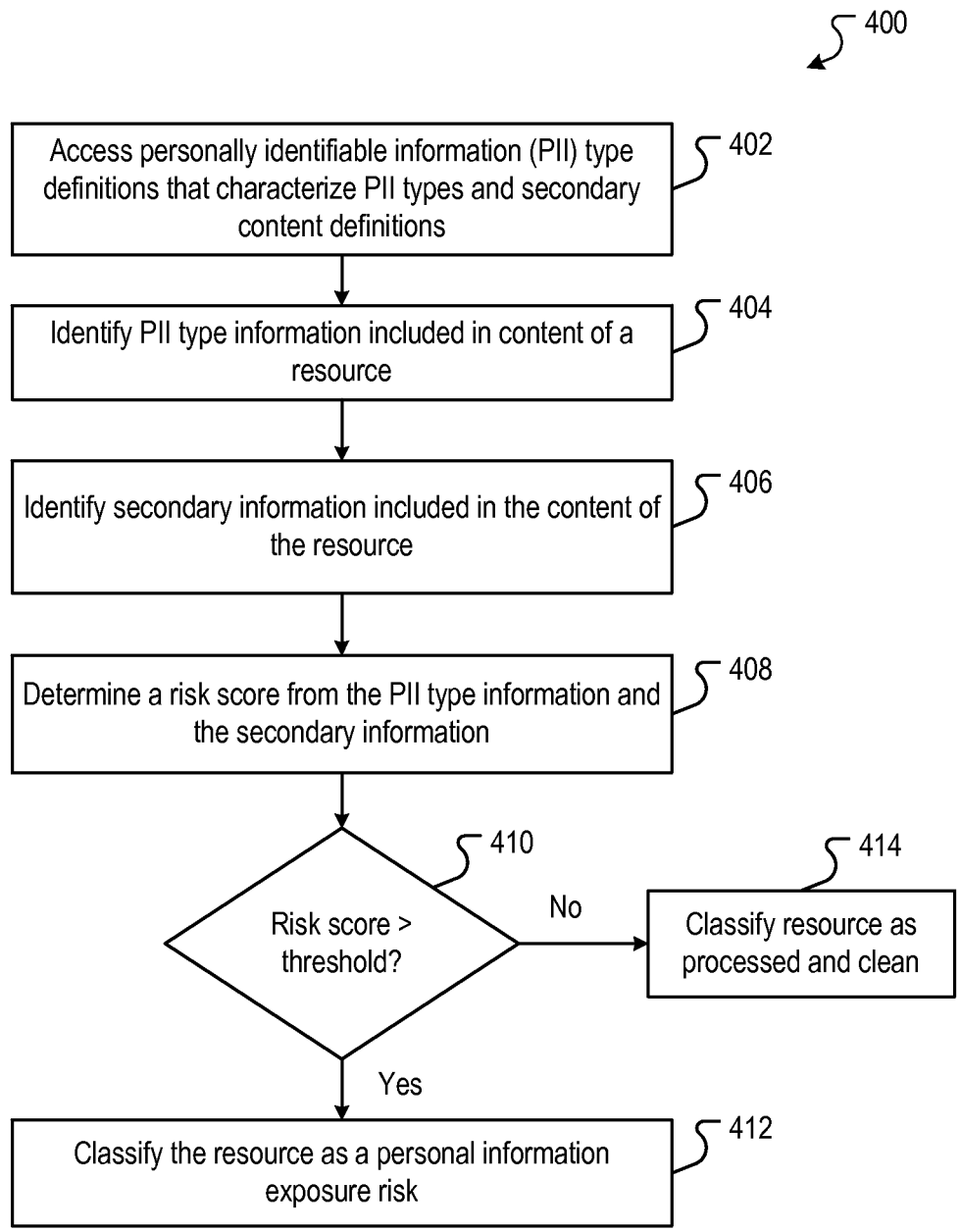
FIG. 4 is a flow diagram of an example process for identifying and processing personally identifiable information in a resource.

After the risk score is calculated, the PII system 120 classifies the resource as described with respect to process stages 410, 412, and 414 in FIG. 4.

Equation (1) is a risk score formula for one recognized instance of PII type information. However, equation (1) can be expanded for multiple instances of PII type information, resulting in equation (2):

$$RS = f((PII_1[1,0],[CR1,D1; \ldots CRn,Dn]) \ldots (PII_q[1,0],[CR1,D1; \ldots CRn,Dn])) \quad (2)$$

where $PII_q[1,0]$ is 1 for each occurrence of PII type information, and q is the number of PII type definitions. Accordingly, while any one instance of PII type information may not result in a score that exceeds a confidentiality threshold, the contribution of scores for each of the multiple instances may result in a risk score that exceeds the confidentiality threshold.

Subsequent Processing for Resources Classified as an Exposure Risk

The search system 110, and/or an entity that maintains a search system 110 may take one of more actions in response to a resource being classified as a personal information exposure risk. For example, the resource may be flagged for review.

In some implementations, the search system 110 may be configured to decrease a relevancy score of any resource that is classified as a personal information exposure risk. The relevancy score measures the relevance of the resource to a query.

Additional Implementation Details

In the implementations described above, the resources that are processed and classified are resources that have been stored in a cache. In some implementations, resources that are indexed but that are not stored in the cache can be processed at query time. For example, several resources that are not stored in the cache may be identified as being responsive to a query. Before search results are generated for these resources, the resources are fetched from the respective websites, and processed as described above. The search system 110 may then take any of the actions described above for any resource that is classified as a personal information exposure risk.

In the examples described above, text data processing techniques are described. However, some malefactors post textual information in the form of an image in an attempt to defeat textual processing techniques. The PII system 120, in some implementations, includes an image processing subsystem that implements optical character recognition processes to detect textual information rendered as images. Accordingly, the same techniques described above can be used for images (or videos) once the textual information is detected.

The example processes can be modified in one or more ways. For example, with reference to FIG. 5, after information is determined to be PII type information (514), a scoring and classification process can be immediately executed. If the resource risk score exceeds the confidentiality threshold, further parsing and processing of the resource can be immediately halted, and the resource can be classified accordingly. If the resource risk score does not exceed the confidentiality threshold, and addition data remains to be processed, then the PII system 120 continues to process the resource until all of the data are processed or until a calculated resource risk score exceeds the confidentiality threshold.

In the examples described above, text processing for Roman character systems are described. However, the processes describe above can be implemented in other writing systems, such as CJK writing systems, writing systems that read from right to left, etc. Additionally, localization can be used for particular countries and writing systems. For example, descriptive terms, formatting and input styles for a government issued identification number of different countries may differ significantly. Accordingly, different keywords and other secondary information can be associated with corresponding PII type information for different countries.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   accessing, by a data processing apparatus, personally identifiable information (PII) type definitions that characterize PII types;
   identifying, by the data processing apparatus, PII type information included in content of a web page, the PII type information being information matching at least one PII type definition;
   identifying a sup-portion of content of the web page, the sub-potion of content being content within a window that includes the PII type information and additional content and excluding other content of the web page;

identifying, by the data processing apparatus, secondary information included in the sub-portion of content of the web page, the secondary information being content that matches information that is predefined as being associated with PII type information;

determining a risk score from the PII type information and the secondary information; and classifying the web page as a personal information exposure risk if the risk score meets a confidentiality threshold, wherein the personal information exposure risk is indicative of the web page including personally identifiable information.

2. The method of claim 1, wherein the PII type definitions include, for each of a plurality of PII types of information that conforms to a particular format, a PII template having data determining a match of content to the particular format.

3. The method of claim 1, wherein the PII type definitions include, for each of a plurality of payment cards having a corresponding payment card number that conforms to a payment card number format, a card number template having data determining a match of content to the payment card number format.

4. The method of claim 3, wherein each card number template comprises:

length data defining a length of the card number; and subset data defining a sequence of numbers that is less than the length of the card number and that is included in the credit card number.

5. The method of claim 4, wherein:

identifying PII type information included in content of a web page comprises identifying the sub-portion of content in the web page that includes sequences of numbers that match subset data and length data of at least one of the credit card templates.

6. The method of claim 5, wherein identifying secondary information included in the content of the web page comprises, for the sub-portion of content in the web page that is identified as including numbers that match subset data and length data of at least one of the credit card templates:

comparing text within a predefined text distance of the sub-portion of content to a plurality of keywords associated with the credit card templates.

7. The method of claim 6, wherein:

each of the plurality of keywords has a corresponding component risk score; and determining a risk score from the PII type information and the secondary information comprises determining a risk score based on the component risk scores of keywords matching the secondary information.

8. The method of claim 7, wherein determining a risk score from the PII type information and the secondary information comprises:

determining, for each keyword matching the secondary information:

a text distance from the secondary information to the sub-portion of content in the web page that is identified as including numbers that match subset data and length data of at least one of the credit card templates; and adjusting the component risk score of the keyword based on the text distance.

9. The method of claim 8, wherein adjusting the component risk score of the keyword comprises adjusting the component risk score in inverse proportion to the text distance.

10. A system, comprising:

a data processing apparatus; and a storage system in data communication with the data processing apparatus and storing instructions executable by the data processing apparatus and that upon such execution cause the data processing apparatus to perform operations comprising:

accessing personally identifiable information (PII) type definitions that characterize PII types;

identifying PII type information included in content of a web page, the PII type information being information matching at least one PII type definition;

identifying a sup-portion of content of the web page, the sub-potion of content being content within a window that includes the PII type information and additional content and excluding other content of the web page;

identifying secondary information included in the sub-portion of content of the web page, the secondary information being content that matches information that is predefined as being associated with PII type information;

determining a risk score from the PII type information and the secondary information; and classifying the web page as a personal information exposure risk if the risk score meets a confidentiality threshold, wherein the personal information exposure risk is indicative of the web page including personally identifiable information.

11. The system of claim 10, wherein the PII type definitions include, for each of a plurality of PII types of information that conforms to a particular format, a PII template having data determining a match of content to the particular format.

12. The system of claim 10, wherein the PII type definitions include, for each of a plurality of payment cards having a corresponding payment card number that conforms to a payment card number format, a card number template having data determining a match of content to the payment card number format.

13. The system of claim 12, wherein each card number template comprises:

length data defining a length of the card number; and subset data defining a sequence of numbers that is less than the length of the card number and that is included in the credit card number.

14. The system of claim 13, wherein:

identifying PII type information included in content of a web page comprises identifying the sub-portion of content in the web page that includes sequences of numbers that match subset data and length data of at least one of the credit card templates.

15. The system of claim 14, wherein identifying secondary information included in the content of the web page comprises, for the sub-portion of content in the web page that is identified as including numbers that match subset data and length data of at least one of the credit card templates:

comparing text within a predefined text distance of the sub-portion of content to a plurality of keywords associated with the credit card templates.

16. The system of claim 15, wherein:

each of the plurality of keywords has a corresponding component risk score; and determining a risk score from the PII type information and the secondary information comprises determining a risk score based on the component risk scores of keywords matching the secondary information.

17. The system of claim 16, wherein determining a risk score from the PII type information and the secondary information comprises:
determining, for each keyword matching the secondary information:
a text distance from the secondary information to the sub-portion of content in the web page that is identified as including numbers that match subset data and length data of at least one of the credit card templates; and
adjusting the component risk score of the keyword based on the text distance.

18. The system of claim 17 wherein adjusting the component risk score of the keyword comprises adjusting the component risk score in inverse proportion to the text distance.

19. Software stored in a non-transitory computer storage medium and storing instructions executable by a data processing apparatus and that upon such execution cause the data processing apparatus to perform operations comprising:
accessing personally identifiable information (PII) type definitions that characterize PII types;
identifying PII type information included in content of a web page, the PII type information being information matching at least one PII type definition;
identifying a sup-portion of content of the web page, the sub-potion of content being content within a window that includes the PII type information and additional content and excluding other content of the web page;
identifying secondary information included in the sub-portion of content of the web page, the secondary information being content that matches information that is predefined as being associated with PII type information;
determining a risk score from the PII type information and the secondary information; and
classifying the web page as a personal information exposure risk if the risk score meets a confidentiality threshold, wherein the personal information exposure risk is indicative of the web page including personally identifiable information.

* * * * *